United States Patent
Duling et al.

[15] 3,665,068
[45] May 23, 1972

[54] EXTRUSION OF EXTREMELY HIGH MOLECULAR WEIGHT POLYOLEFINS

[72] Inventors: Irl N. Duling, West Chester; John C. Merges, Jr., Glen Mills, both of Pa.

[73] Assignee: Sun Oil Company, Philadelphia, Pa.

[22] Filed: Dec. 15, 1969

[21] Appl. No.: 884,879

Related U.S. Application Data

[63] Continuation-in-part of Ser. No. 745,884, July 18, 1968, abandoned.

[52] U.S. Cl................264/211, 260/28.5 A, 260/94.9 GD, 260/897 A, 264/329, 264/349
[51] Int. Cl...................B29b 1/04, B29f 1/08, C08f 45/52
[58] Field of Search............264/176 R, 211, 178, 209, 349, 264/40, 329; 260/28.5 A, 897 A, 94.9 GD, 94.9 R, 94.9 GC

[56] References Cited

UNITED STATES PATENTS

| | | | |
|---|---|---|---|
| 3,219,728 | 11/1965 | Joris et al. | 260/28.5 A |
| 3,446,884 | 5/1969 | Miller et al. | 264/209 |
| 3,376,244 | 4/1968 | Rundle | 264/178 |
| 3,066,356 | 12/1962 | Porter | 264/211 |
| 3,392,224 | 7/1968 | Archer | 264/176 R |

Primary Examiner—Robert F. White
Assistant Examiner—Jeffery R. Thurlow
Attorney—George L. Church, Donald R. Johnson and Wilmer E. McCorquodale, Jr.

[57] ABSTRACT

A polyethylene having a molecular weight in excess of 1,000,000 or a polypropylene having a molecular weight in excess of 400,000 can be easily extruded by this invention. A heterogeneous composite of either polyolefin and a carrier is established and supplied to an extruder comprising a transport screw having a surface providing frictional resistance to the movement of the composite no greater than that of polished steel and a die having a surface providing lower frictional resistance to the movement of the composite than polished steel. Within the die the heterogeneous composite is first shaped at a temperature below the melting point of the polyolefin and then is heated until the composite becomes homogeneous, after which the shape is cooled to solidify. The carrier can be a petroleum wax, certain liquid hydrocarbons, synthetic wax or mixtures thereof having certain attributes, defined herein, relative to the polyolefin.

8 Claims, 2 Drawing Figures

Patented May 23, 1972
3,665,068
2 Sheets-Sheet 1
FIGURE I
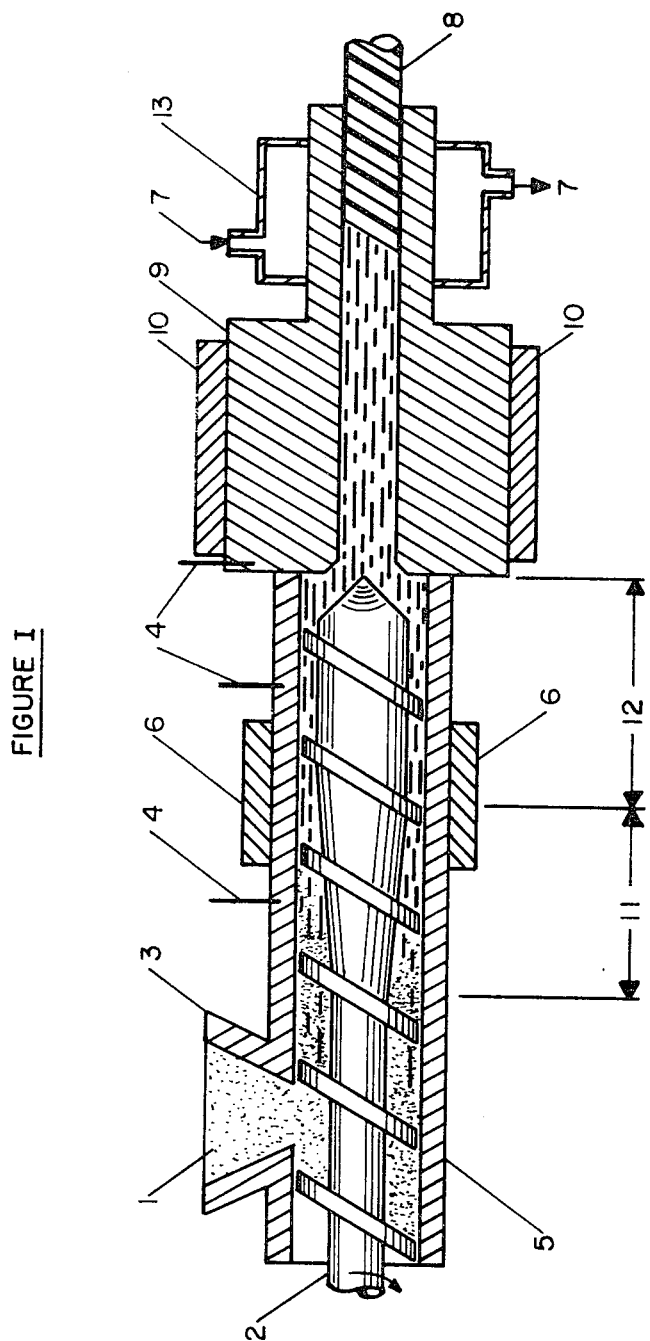
INVENTORS
IRL N. DULING
JOHN C. MERGES, JR.

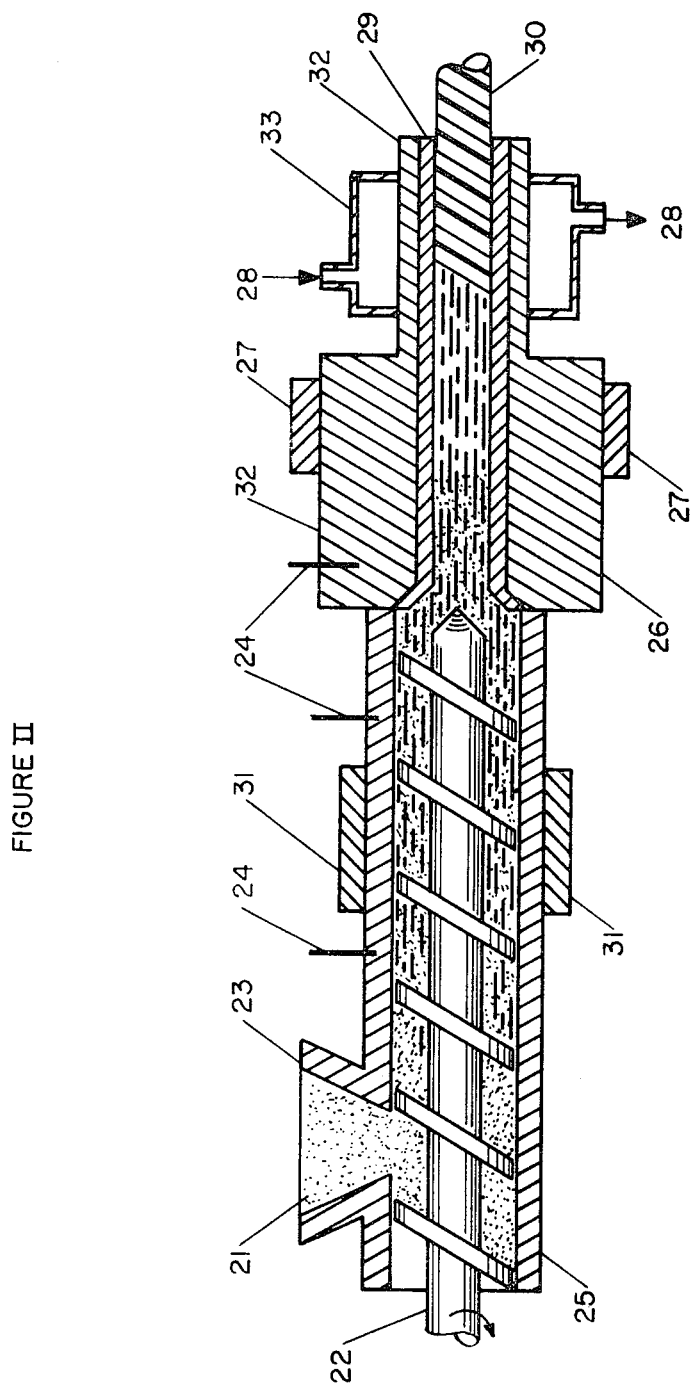
FIGURE II 3,665,068

EXTRUSION OF EXTREMELY HIGH MOLECULAR WEIGHT POLYOLEFINS

CROSS REFERENCE TO RELATED APPLICATIONS

This application is a continuation-in-part of our copending application Ser. No. 745,884, filed July 18, 1968, now abandoned. This application is copending with two other continuation-in-part applications: Serial No. 885,355, which relates to a method of forming porous objects from polyethylene having an extremely high molecular weight and Serial No. 884,847, which relates to a method of preparing a polymer coated-wax impregnated cellulosic stock. Both of these applications filed of even date with this application.

BACKGROUND OF THE INVENTION

This invention relates to an improved extrusion process for extruding, with modified equipment, a unitary homogeneous body of desired shape from certain polyolefins which are normally difficult to extrude, and a carrier defined herein. These polyolefins are polyethylene with a molecular weight in excess of 1,000,000 and polypropylene with a molecular weight in excess of 400,000. The term polyolefin hereinafter refers only to the aforementioned polyethylene and polypropylene.

These polyolefins have certain properties superior to similar polymers with lower molecular weights. These superior physical properties are: toughness, impact strength, abrasion resistance, antifriction, good performance at temperature below freezing and excellent stability at temperatures as high as 300° F. However these polyolefins, when extruded in conventional equipment, undergo shear degradation. This degradation results in a substantial reduction in molecular weight which in turn results in a substantial reduction of the heretoforementioned superior physical properties.

G. G. Joris et al. U.S. Pat. No. 3,219,728, dated Nov. 23, 1965, describes a technique for extruding a thermoplastic polymer susceptible to shear degradation. Pelletized "difficultly extrudable" polyethylene particles which are coated with a mixture of polyethylene wax and paraffin wax are supplied to a screw extruder operating at about 205°–220° C. This temperature is substantially above the approximate 135° C. melt point of the "difficulty extrudable" polyethylene. Within the extruder the molten materials are formed into the shape of pipe and then are cooled to solidify the mixture in this form.

The addition of the two waxes to the "difficultly extrudable" polyethylene, having a molecular weight of 1,000,000, in the aforementioned United States patent permits the operation of the extruder at a lower temperature than when only said polyethylene is extruded. While the temperature of this mixture in the extruder is lower than when operating without the two waxes, it is still above the melting point of the high molecular weight polyethylene. But because this mixture is being moved through the extruder as a molten mass the high molecular weight polyethylene still undergoes substantial shear degradation.

C. B. Satterthwaite, U.S. Pat. No. 2,824,780, dated Feb. 25, 1958, teaches the preparation of fibers from synthetic fiber-forming polymers by forcing discrete particles in a suitable liquid through an orifice into a heated zone where the polymer coalesces to form a funicular article. However no article could be extruded through a conventional die by us using the concept of Satterthwaite's teaching with a dispersion of 75 to 99 parts by weight of discrete polyolefin particles and 1 to 25 parts by weight of a liquid carrier.

W. Ferrell et al., U.S. Pat. No. 3,051,995, dated Sept. 4, 1962, teach that a plastisol, in which polyvinyl chloride particles are but partially solvated by the plasticizer fluid such as dioctylphthalate, may be heated to a temperature at which solvation is rapid and gelation normally occurs, without undergoing gelation provided there is suitable agitation. However if a dispersion of 75 to 99 parts by weight of polyolefin and 1 to 25 parts by weight of a carrier are heated to a temperature where gelation occurs agitation with normally sized equipment is extremely difficult and at a higher polymer concentration almost impossible. Furthermore if agitation occurs with oversized equipment the molecular weight of the polyolefin is substantially reduced by shear degradation.

SUMMARY OF THE INVENTION

The present invention provides an improved extrusion process for forming a unitary homogenous body of desired shape from a composite of polyolefin and carrier. The improvement is that the polyolefin does not undergo substantial shear degradation as it does when extruded by conventional equipment and at conventional temperatures and pressures. The improved process comprises establishing a heterogeneous composit of solid particulate polyolefin and a liquid carrier. The carrier can be a petroleum wax or certain liquid hydrocarbons or a synthetic wax or a mixture of carriers, said carrier having attributes defined herein. The heterogeneous composite is transported via a screw having a surface providing frictional resistance to the movement of the composite no greater than that of polished steel, to a die having a surface providing lower frictional resistance to the movement of the composite than polished steel. Then the shape is formed from the heterogeneous composite without melt- ing the polyolefin. Thereafter the temperature of the shape is raised above the melting point of the polyolefin whereby the heterogeneous shape becomes homogeneous. Said shape is then cooled to solidify.

BRIEF DESCRIPTION OF THE DRAWING

FIG. I is a cross section of a typical extruder comprising conventional components operating at conventional conditions for forming a continuous rod.

FIG. II is a cross section of an extruder comprising a transport screw and modified die using the operating conditions of this invention for forming a rod.

DESCRIPTION

A conventional method of extruding a unitary shape is illustrated in FIG. I. The thermoplastic polymer and other material 1 is fed into a funnel-shaped hopper 3. The mixture drops by gravity into the channel of the compression screw 2 rotating within the extruder barrel 5 and is forced forward by the rotating screw flights. As the mixture moves, it is heated by heaters 6 and the mechanical work applied, melted thoroughly, mixed and compressed by a series of flow patterns inside the screw channels. On its way through the barrel 5 the solid mixture is transformed into a homogeneous melt. Note that somewhere in the compression section 11 the mixture is normally completely molten. The molten matter leaves the metering section 12 and enters the die 9 which is heated by heaters 10. In the die 9 the molten matter is shaped. The molten shape is cooled and solidified by coolant 7 entering and leaving a cooler 13. In this illustration a solid rod 8 is the product; other possible products include such shapes as pipe, tube and profiles. Thermocouples 4 are in strategic locations throughout the equipment; the specific locations are not necessarily as shown.

Note that a compression screw 2 is normally used in the conventional extruder to extrude, for example, a polyethylene with a molecular weight in the range between from 100,000 to 300,000. This compression screw is normally of the constant pitch, decreasing channel depth, metering type. Materials of construction for screws vary, but most are made from an alloy steel such as 4140. Chromium plating the screw is common. Such screws are more corrosion resistant and can usually be cleaned of plastics more rapidly than non-plated types. Extrusion dies, such as 9, are usually made from tool steel. The inner surface of the die is highly polished, although sometimes it is chromium plated.

The heat which melts the polymer and other material is supplied by external heaters 6 and 10 and by internal frictional forces brought about by the compounding and compressing action of the compression screw 2. The amount of such frictional heat is substantial, and particularly for a low molecular weight polyethylene it represents most of the total heat supplied to the forming mixture. Electricity, steam or hot oil can be used to heat the barrel or die externally. Electric resistance heating is generally preferable because it is most convenient, responds rapidly, is easiest to adjust and requires a minimum of maintenance. Note that with this compounding, compressing, and metering action the molten material is exposed to severe mechanical stresses if it resists forward motion.

Extrusion by this invention is shown in FIG. II. A heterogeneous composite of the polyolefin and carrier 21, both defined herein, is fed into a funnel-shaped hopper 23. The composite drops by gravity into the channel of the transport screw 22 rotating within the extruder barrel 25 and is moved forward by the rotating transport screw 22. However, as the mixture moves the heaters 31 supply less heat than for the process shown in FIG. I; so that while the polymer and the carrier are thoroughly mixed the temperature throughout the barrel 25 is always below the melting point of the polymer. Yet the temperature somewhere in the barrel 25 can become greater than the melting point of the carrier, for example when the carrier is a petroleum wax. The heterogeneous melt passes to the die 32 wherein the heterogeneous melt is formed into the desired shape. Note that the internal surface of the die 32 is coated with material 29 providing lower frictional resistance to the movement of the composite than polished steel. After the heterogeneous melt is shaped in the die 32, heaters 27 supply sufficient heat to transform the heterogeneous melt into a homogeneous melt. That is to say, the temperature of the heterogeneous melt is raised to above the melting point of the polyolefin. As previously mentioned electricity, steam or hot oil can be used to heat the die externally. Further along in the die 32 the molten homogeneous shape is cooled and solidified by coolant 28 entering and leaving a cooler 33. In this illustrative example of the invention a solid rod 30 is the product; other possible products include such shapes as pipe, tube and profiles. Thermocouples 24 are in strategic locations throughout the equipment; the specific locations are not necessarily as shown.

The extruder used in this invention differs from the conventional extruder in two ways. The first concerns the screw, the second the die. In this invention the screw is a transport screw rather than a compression screw. The transport screw has a constant pitch and a constant channel depth. This type of screw never exerts any forces on the polyolefin particles other than the minimal frictional force of the particles and carrier sliding past the barrel wall and surface of the screw. This is in comparison to a compression screw under conventional techniques, which in addition to the frictional forces experienced in a transport screw, compresses the molten mass and causes shear degradation as the molten mass resists the forward flow.

The surface of the transport screw used in this invention can be polished alloy steel, or some other surface offering no greater frictional resistance than polished alloy steel. A chromium plated screw would be an example of a surface offering less frictional resistance than polished alloy steel.

The second difference concerns the die. The inner surface of the die must provide lower frictional resistance to the movement of the composite than polished steel. Attempts to extrude the composite through polished steel dies were unsuccessful. Examples of surfaces providing lower frictional resistance to the movement of the composite than polished steel are as follows: polyimide polymer coating, fluorocarbon polymer coating and chromium plating. A fluorocarbon polymer coating is preferred. Fluorocarbon polymer refers to chemically inert compounds, solid at ambient temperature, composed entirely of carbon and fluorine, e.g. polytetrafluorethylene. Polyimide polymer refers to thermally stable heterocyclic polymers which can be prepared from polyamides with o-carboxyl groups. This latter reaction is shown in Kirk-Othmer, ENCYCLOPEDIA OF CHEMICAL TECHNOLOGY, 2nd Edition, Vol. 16, page 42.

Susceptibility to shear degradation in a polymer depends both on the monomer making up the polymer and the molecular weight of the polymer. Thus polyethylene with a molecular weight of 100,000 when extruded undergoes little if any shear degradation, yet polyethylene with a molecular weight of 3,000,000 is extremely susceptible to shear degradation during conventional extrusion. Polypropylene with a molecular weight of 100,000 when extruded undergoes slight shear degradation, yet polypropylene with a molecular weight of 600,000 cannot be conventionally extruded because of its extremely low melt index. Thus in defining the problem of shear degradation it is difficult to draw the molecular weight dividing line separating those molecular weights at which the polymer undergoes substantial degradation from those that do not. Notwithstanding this difficulty polyethylene with a molecular weight in excess of one million should be used. Polyethylene with a molecular weight of 6,000,000 is available. For polypropylene the molecular weight should be in excess of 400,000. Polypropylene with a molecular weight of 2,000,000 is available.

The heretoforementioned molecular weights are determined in the following manner. The reduced viscosity of the polyethylene or the intrinsic viscosity of the polypropylene is determined according to ASTM D1601-61 using terehydronaphthalene and a temperature of 135° C. Using the relationship between reduced specific viscosity (reduced viscosity) and molecular weight reported in "Properties and Uses of Very High-Molecular-Weight, High-Density Polyethylene," W. E. Gloor, Modern Plastics, 221, pages 131–136, Nov. 1961, and the measured reduced viscosity, the molecular weight of the polyethylene is determined. The molecular weight of the polypropylene is determined using the measured intrinsic viscosity and the relationship between intrinsic viscosity and molecular weight reported in the J. of Physical Chemistry, 63, 1967, pages 2,002–2,007, "Intrinsic Viscosity-Molecular Weight Relationships for Isotactic and Atactic Polypropylene," J. B. Kinsinger et al.

The problem of extruding the polyolefin defined herein can be further indicated by comparison of the rate of extrusion of molten polyethylenes and polypropylenes through an orifice of a specified length and diameter under prescribed conditions of temperature and pressure (ASTM D1238-65T Tentative Method of Measuring Flow Rates of Thermoplastics by Extrusion Plastometer). For example, ASTM D1238-65T states that a polyethylene at 125° C. and under a 325 g. load (Procedure B) had a nominal flow rate of 0.25 g./10 min. Such a flow rate, using Procedure B, is typical of a low molecular weight polyethylene. However, the polyethylene extruded in the subsequent Examples I–V at 190° C. and under a 21,600 g. load (Procedure F) has no measurable flow rate. Similarly ASTM D1238-65T states that a polypropylene using Procedure B had a nominal flow rate of 0.4 g./10 min. Such a flow rate at these conditions is typical of a low molecular weight polypropylene. However the polypropylenes that can be extruded by this invention using Procedure F have no measurable flow rate.

By this invention either polyolefin can be formed easily into desired shapes by the use of a carrier. The carrier can be either solid or liquid at ambient conditions. The liquid carrier can be any liquid hydrocarbon with a molecular weight in excess of about 200, preferably a molecular weight in excess of 300. One example is a white mineral oil, another paraffinic lubricating oil fraction. A solid carrier can be either a petroleum wax or a synthetic wax. The petroleum wax used as a carrier can be obtained by any one of the processes described in chapter 5 of The Chemistry and Technology of Waxes by A. H. Warth, 2nd Edition, and can be any one of the refined or unrefined petroleum waxes described in the same chapter. Synthetic waxes that can be used as a carrier are described in chapter 6 of the aforementioned reference. Any one of the previously mentioned carriers must have certain attributes. These attributes are: (1) the carrier will not be readily absorbed by the polyolefin below the polyolefin's melting point but will be readily absorbed by the polyolefin at or above the polyolefin's melting point; (2) the carrier should have a melting point at least 20° F. below the thermoplastic polyolefin and preferably at least 40° F.; (3) the carrier's viscosity at or just in excess of its melting temperature should be at least one-tenth and preferably at least one one-hundredth of the viscosity of the non-carrier thermoplastic polyolefin at or above the polyolefin's melting point. The carrier can be also a mixture of two or more of the previously mentioned carriers.

The aforementioned white mineral oils are substantially free of unsaturated compounds or aromatic radicals, e.g., the phenyl or naphthyl radical. They are substantially non-volatile both at room temperature and under usual extrusion conditions; i.e., they boil at a temperature of 200° C. or higher at 760 millimeters of mercury absolute pressure. They ordinarily possess a viscosity lying in the range of from 10 to 70 centistokes at 100° F.

The proportions of the polyolefin to carrier depends on the desired physical properties of the final shape. One to 25 parts by weight of carrier and 75 to 99 parts by weight of polyolefin are satisfactory proportions. For a polyethylene with a molecular weight of 1,500,000 and a wax a more desirable range of wax is between 2.5 percent and 20 percent by weight. For a polypropylene with a molecular weight of 600,000 and a liquid carrier a more desirable range of carrier is between 5 percent and 20 percent by weight.

The preliminary step of the method of the invention involves forming a heterogeneous blend of polyolefin and carrier. For a solid carrier, such as paraffin wax, this is most conveniently accomplished by charging the carrier to a suitable mixer, e.g., a sigma blade mixer, equipped with heating means. The wax is heated to a temperature above its melting point, but below the melting point of the yet to be charged polyolefin. After the wax has softened, particles of the solid polyolefin are charged to the mixer. The mass is worked until it is completely mixed while the temperature is held at the level above specified. This heterogeneous blend can be directly fed to an extruder. Or, a friable powder can be obtained by shutting off the heat to the mixer and maintaining the mixing. For a liquid carrier, such as white mineral oil, the heterogeneous blend can be obtained by adding the liquid carrier to a vessel equipped with a stirrer and heating devices. The temperature of the carrier can be brought up to 20° F. to 40° F. below the melting point of the yet to be charged polymer. The polymer is charged to the vessel and mixing continued until a well mixed composite is obtained. This composite can be transported to the extruder where it will be used at the processing conditions specified for this invention.

Next the composite of the polyolefin and carrier is fed to an extruder comprising a transport screw having a surface providing frictional resistance to the movement of the composite no greater than that of polished steel and a die having a surface providing a lower frictional resistance to the movement of the composite than polished steel. In the die the heterogeneous composite of polyolefin and carrier is first forced into the desired shape at a temperature above the melting point of the carrier but below the melting point of the polyolefin. After this shaping and while under pressure the temperature of the shaped material is raised to above the melting point of the polyolefin and it becomes a homogeneous body. Thereafter said body is cooled until it solidifies.

EXAMPLES I-V

Polyethylene, as described hereafter, was placed in a sigma blade mixer maintained at 200° F. Petroleum wax was added until it comprised 25 percent of the total weight. One part of 2,2'-methylene-bis-(4-methyl-6-t-butylphenol), an antioxidant, was added to every thousand parts of polymer and wax. Typical properties of this polyethylene are:

| | |
|---|---|
| Specific gravity | 0.940–0.942 |
| Melt index, ASTM D1238 | nil |
| Crystalline melting point | 266–268° F. |
| Molecular weight | 1,250,000 |

Typical physical properties of the petroleum wax are:

| | |
|---|---|
| Melting point, ASTM D127 | 195° F. |
| Viscosity SUS at 210° F. | 84 |
| Specific gravity at 60° F. | 0.943 |

The mixing was continued until all of the wax melted and a well-mixed blend was obtained. At 200° F. the polyethylene did not melt and there was no appreciable absorption of the polyethylene by the wax. Heat to the sigma blade mixer was shut off and the blend was allowed to cool while agitation was maintained. When cooled to ambient temperature the composition was a granular, free-flowing powder consisting essentially of particles of the polyethylene coated with wax.

This powder was fed to an extruder equipped with a 1:1 compression ratio transport screw whose surface was chromium plated. The extruder was fitted with a ¼-inch rod die whose inner surface was coated with a fluorocarbon polymer. The temperature in the front of the barrel was 220° F., the rear of the barrel 205° F., while the die was maintained at 300° F. These barrel temperatures kept the wax molten but did not melt the solid polyethylene. As the slurry was transported to the heated die, the action of the transport screw forced the slurry into the shape of the ¼-inch rod die. As the forced blend passed into the heated portion of the die the combination of heat and pressure fused the slurry into a homogeneous ¼-inch diameter rod. The fused rod emerged at a rate of about 4 grams per minute. The aforementioned extrusion was repeated using 2.5, 5.0, 10.0 and 15.0 weight percent of the wax.

Next, standard test specimens were prepared from the rods extruded as described heretofore. The specimens were prepared and tested according to ASTM D638-67T (Tentative Method of Test for Tensile Properties of Plastics). The physical properties of the extruded polyethylene and wax blends were as shown in the following table.

TABLE

Physical Properties of Extruded Samples

| Polyethylene and | Yield Point, p.s.i. | Tensile Strength at Break p.s.i. | Elongation % | Modulus of Elasticity, p.s.i. |
|---|---|---|---|---|
| 2.5 wt. % wax | 2,840 | 3,470 | 599 | 47,600 |
| 5.0 wt. % wax | 2,743 | 3,370 | 565 | 44,730 |
| 10.0 wt. % wax | 2,765 | 2,975 | 562 | 43,600 |
| 15.0 wt. % wax | 2,770 | 3,141 | 603 | 47,900 |
| 25.0 wt. % wax | 2,800 | 3,385 | 602 | 54,200 |

These results indicate that the physical properties of the polyethylene and wax blends do not vary appreciably as the amount of wax varies from 2.5 to 25 weight percent.

The molecular weights of the fused polyethylene in these rods as determined by reduced viscosity in tetrahydronaphthalene at 135° C. were as follows:

| Polyethylene and | Molecular Weight |
|---|---|
| 2.5 wt. % wax | 870,000 |
| 5.0 wt. % wax | 970,000 |
| 10.0 wt. % wax | 870,000 |
| 15.0 wt. % wax | 870,000 |
| 25.0 wt. % wax | 920,000 |

These results indicate that the molecular weights of the polyethylenes in the polyethylene and wax blends do not vary appreciably as the amount of wax varies from 2.5 to 25 weight percent.

Substantially equivalent results, as in the aforementioned specific example, are obtained when (1) other carriers are used and/or (2) the other polyolefin is used.

What is claimed is:

1. An extrusion process for forming a unitary homogeneous body from finely divided polyolefin, said polyolefin being selected from the group consisting of polyethylene with a molecular weight in excess of 1,000,000 and polypropylene with a molecular weight in excess of 400,000, which comprises:
    a. establishing a heterogeneous composite of 75 to 99 parts by weight of said polyolefin and 1 to 25 parts by weight of a carrier, said carrier being selected from the group consisting of petroleum waxes, liquid hydrocarbons with a molecular weight in excess of 200, synthetic waxes and mixtures thereof, said carrier having the following attributes: (1) a melting point at least 20° F. lower than that of said polyolefin; (2) a viscosity at a temperature just above its melting point of not more than one-tenth of that of said polyolefin at a temperature just above its melting point; and (3) substantial nonabsorbability of said carrier by the polyolefin below the melting point of said polyolefin but substantial absorbability thereof above the melting point of said polyolefin;
    b. feeding said heterogeneous composite to an extruder comprising a transport screw having a surface providing frictional resistance to the movement of the composite no greater than that of polished steel and a die having an inner surface providing lower frictional resistance to movement of the composite than polished steel, said die comprising a shaping section at its inlet and a heating section in the middle and a cooling section at its outlet;
    c. transporting the heterogeneous composite to the die while maintaining the temperature of the composite at a level above the melting point of said carrier but below the melting point of said polyolefin;
    d. forcing said composite into and through said shaping section to form a heterogeneous body of the desired shape while maintaining the temperature at said level;
    e. thereafter heating the heterogeneous body while under pressure in said heating section to a temperature above the melting point of the polyolefin to fuse same and form said unitary homogeneous body;
    f. thereafter cooling the so-formed body while in the cooling section of the die to a temperature below the melting point of the polymer; and
    g. extruding the cooled mass from the extruder.

2. A method according to claim 1 wherein the composite during passage through the die in steps (d) and (e) contacts die surfaces composed of a material selected from polyimide polymer, fluorocarbon polymer and chromium.

3. A method according to claim 2 wherein the composite in step (c) is transported through contact with chromium plated surfaces of the transport screw.

4. A method according to claim 1 wherein the carrier is a petroleum wax.

5. A method according to claim 1 wherein the polyolefin is polyethylene having a molecular weight in the range between from 1,000,000 to 6,000,000.

6. A method according to claim 5 wherein the composite in step (c) is transported through contact with chromium plated surfaces of the transport screw and wherein the composite during passage through the die in steps (d) and (e) contacts die surfaces composed of a material selected from polyimide polymer, fluorocarbon polymer and chromium.

7. A method according to claim 1 wherein the polyolefin is polypropylene having a molecular weight in the range between from 400,000 to 2,000,000.

8. A method according to claim 7 wherein the composite in step (c) is transported through contact with chromium plated surfaces of the transport screw and wherein the composite during passage through the die in steps (d) and (e) contacts die surfaces composed of a material selected from polyimide polymer, fluorocarbon polymer and chromium.

* * * * *